United States Patent [19]

Sugita et al.

[11] Patent Number: 4,592,413
[45] Date of Patent: Jun. 3, 1986

[54] THROUGH-WALL TYPE AIR CONDITIONER

[75] Inventors: Kiyoshi Sugita, Warabi; Hiroshi Nakanishi, Fujisawa, both of Japan

[73] Assignees: Matsushita Seiko Co., Ltd., Osaka; Kajima Corporation, Tokyo, both of Japan

[21] Appl. No.: 449,226

[22] Filed: Dec. 13, 1982

[30] Foreign Application Priority Data

Dec. 14, 1981 [JP] Japan .................................. 56-202174

[51] Int. Cl.⁴ ............................................... F24F 7/00
[52] U.S. Cl. ........................................ 165/59; 62/160; 62/263; 165/16; 165/66
[58] Field of Search .................. 62/263, 262, 159, 160; 98/94 AC; 237/2 B; 165/76, 66, 58, 59, 61, 16

[56] References Cited

U.S. PATENT DOCUMENTS

| 3,921,416 | 11/1975 | Murnane et al. | 62/262 X |
| 3,938,348 | 2/1976 | Rickert | 62/262 |
| 4,129,996 | 12/1978 | Hardin et al. | 62/262 |
| 4,429,735 | 2/1984 | Nomaguch et al. | 62/304 |

FOREIGN PATENT DOCUMENTS 100648  9/1978  Japan ..................................... 62/262

*Primary Examiner*—Henry Bennett
*Attorney, Agent, or Firm*—Stevens, Davis, Miller & Mosher

[57] ABSTRACT

A through-wall heat pump air conditioner having a total heat exchanger between the interior and exterior unit rooms is disclosed for recovering waste heat from the exhaust air. The conditioner includes two auxiliary dampers respectively provided between the exhaust air path and the heat exchanger and between the intake air path and the heat exchanger, whereby penetration of external air into the room is prevented during the halt state of the air conditioner.

6 Claims, 10 Drawing Figures

THROUGH-WALL TYPE AIR CONDITIONER

The present invention relates to a through-wall type heat pump air conditioner, and contemplates providing a through-wall type heat pump air conditioner having a total heat exchanger for recovering waste heat between an interior unit room and an exterior unit room, wherein air is ventilated during the cooling and heating operations while the heat of the exhaust air is recovered during such operations, or the air conditioner is operated to merely perform cooling with ventilation, the air conditioner being provided with a facility for preventing the external air from penetrating into the room when all operations are halted.

The conventional through-wall type heat pump air conditioner installed in a perimeter zone has a total heat exchanger for recovering waste heat in the exhaust air provided between the interior unit room and the exterior unit room within a single cabinet, and the total heat exchanger is provided at its both ends with a double wing damper which recovers the waste heat from the exhaust air during the cooling or heating operation.

In such a conventional installation, however, when the cooling or heating operation is halted, the outer air penetrates into the room through the total heat exchanger by natural convection, resulting in a slow response of the cooling or heating effect.

The present invention contemplates the elimination of the foregoing prior art deficiency.

The invention will be described hereinafter with reference to the accompanying drawings, in which.

Figure 1A:
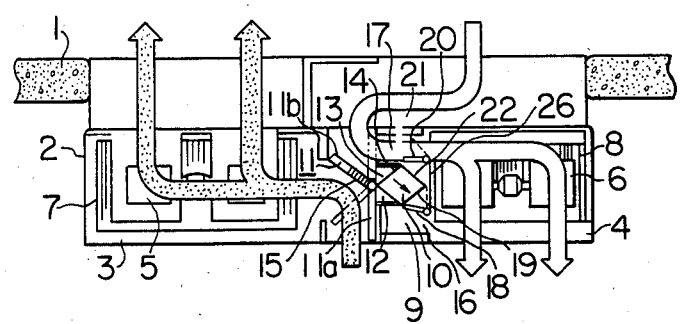
FIGS. 1a and 1b are cross-sectional plan views of the through-wall type air conditioner according to the present invention, which show two operational modes of the conditioner.
Figure 1B:
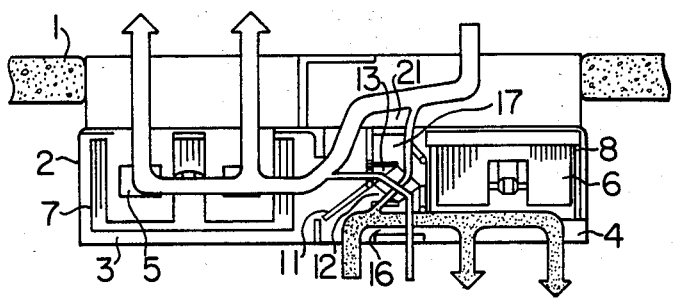
Figure 2:
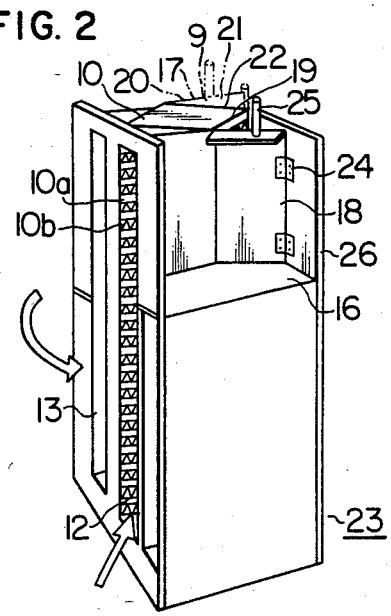
FIG. 2 is a perspective view of the total heat exchange unit used in the inventive air conditioner.
Figure 3:
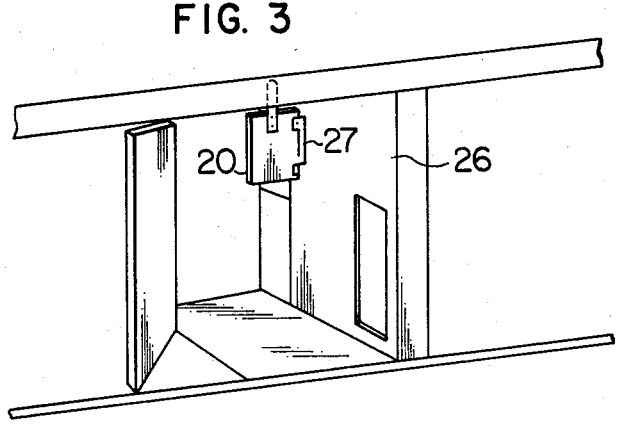
FIG. 3 is a partial perspective view of the air conditioner with the total heat exchanger being removed.

The inventive arrangement of the through-wall type air conditioner shown in FIGS. 1a and 1b includes inside a perimeter zone wall 1 an air conditioner main unit 2, an exterior unit room 3, an interior unit room 4, an exterior blower 5, an interior blower 6, an exterior heat exchanger 7, and an interior heat exchanger 8. Reference number 9 denotes a total heat exchange unit including a total heat exchanger 10 as the principal component, and the unit is detachable provided on the side of the room. The total heat exchange unit 9 has a double wing damper 11 at its one end, the damper 11 comprises a damper 11a for controlling the interior air path 12 and a damper 11b for controlling the exterior air path 13. The damper 11b is provided with an aperture structure 15 for conducting air which flows through one side 14 of the total heat exchanger 10, which has 1st and 2nd air-paths 10a, 10b stacked vertically and alternately crossing each other (FIG. 1b, FIG. 2). Numeral 16 designates an exhaust air path conducted to the interior unit room 4. On the top side of the exterior air path 13, there is an intake air path 17 conducted to an air intake 21. Numeral 18 designates a first auxiliary damper provided between the exhaust air path 16 and one side 19 of the total heat exchanger 10, and 20 designates a second auxiliary damper provided between the intake air path 17 and one side 22 of the total heat exchanger 10, both damper 18 and 20 being interlocked to move jointly as will be described shortly. The first and second dampers 18 and 20 are attached by hinges 24 and 27, respectively, to a partition board 26 which separates the total heat exchange unit 9 from the interior unit room 4, as shown in FIGS. 2 and 3.

Figure 4:
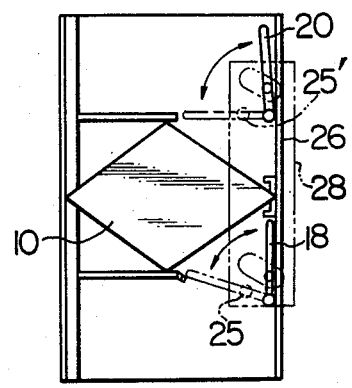
FIG. 4 is a plan view showing the spatial relationship between the total heat exchanger and the first and second auxiliary dampers.
Figure 5:
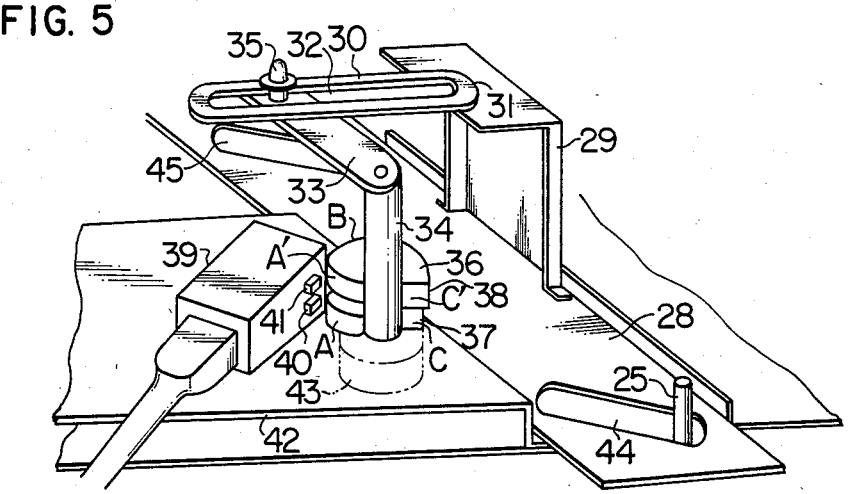
FIG. 5 is a perspective view of the mechanism for providing a joint movement of the first and second auxiliary dampers.
Figure 7A:
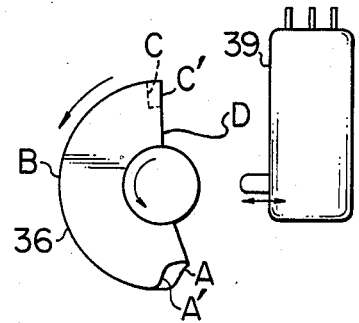
FIGS. 7A and 7B are a plan view and a side view showing the relationship between the cam set and limit switches.

FIG. 4 shows as a plan view the relationship between the total heat exchanger 10 and an interlocking link bar 28 which jointly moves the first and second auxiliary dampers 18 and 20, and FIG. 5 shows the mechanism for driving the link bar 28. A supporter 29 is fixed on the link bar 28 by welding or the like, and a turn ring 30 having an elongate opening 32 is fixed at its one end to the supporter 29 by welding or the like. Numeral 33 designates an arm fixed at its one end to the end of a cam shaft 34, and a pin 35 is fixed at another end of the arm 33. The pin 35 is engaged with the elongate turn ring 30 so that the pin 35 rotates within the opening 32 being guided by the ring 30 when the arm 33 rotates. The rotation of the pin 35 results in causing a reciprocating motion of the link bar 28 in the longitudinal direction. Numeral 36 designates a cam set formed in a hemispheric shape as a unitary member with the cam shaft 34, including a first-stage cam 37 and a second-stage cam 38. The limit switch 39 includes a 1st limit switch 63 and a 2nd limit switch 64. In more detail, the first-stage cam 37 has contact positions A and C which act on the contact point 40 of the 1st limit switch 63, and the second-stage cam 38 has contact positions A' and C' which act on the contact point 41 of the 2nd limit switch 64. The contact positions A and A' and C and C' are differentially located as shown in FIG. 7A so that the limit switches operate at slightly different timings when the cams come into contact with the contact points 40 and 41. The cam set 36 is coupled to a damper motor 43 (shown by the dashed line) located behind the base 42, and the cam set 36 makes one revolution (180°—Stop—180°) when the damper motor 43 is electrically energized. Numerals 44 and 45 designates apertures for guiding pins 25 and 25' for moving the first and second auxiliary dampers 18 and 20 in the opening or closing operation.

Figure 8:
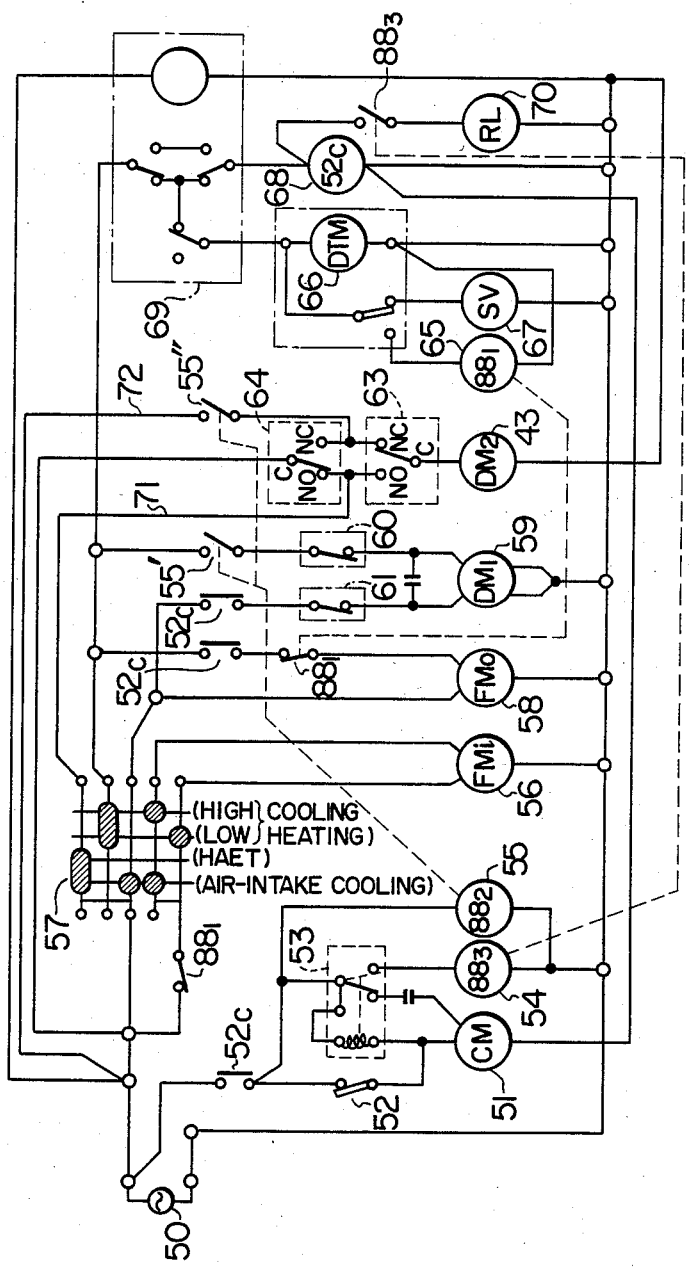
FIG. 8 is a schematic diagram of a circuit for operating the auxiliary dampers.

The following will describe the circuit shown in FIG. 8. In the figure, reference number 50 denotes a power source, 51 is a compressor, 52 is the contact of an overload relay, and 53 is a compressor protecting relay. Numeral 54 designates an auxiliary relay with its one end connected to the power source and with another end connected to the compressor protecting relay 53. Numeral 55 designates another auxiliary relay with its one end connected to the power source and another end connected to the contact of an electromagnetic switch 52C for the compressor. Numeral 56 designates an interior blower with its one end connected to the power source and another end connected to a rotary switch 57, and 58 designates an exterior blower with its one end connected to the power source and another end connected to the rotary switch 57. Numeral 59 designates a motor for driving the double wing damper shown in FIG. 1 with one end connected to the power source and with another end connected to limit switches 60 and 61. Numeral 43 designates the damper motor for driving the auxiliary dampers with one end connected to the power source and with another end connected through the first and second limit switches 63 and 64 to the rotary switch 57 and the power source. The rotary switch has four control positions "air-intake cooling", "halt", "low cooling/heating", and "high cooling/heating" and conducts input and output terminals via hatched areas defined respectively for the control positions. Numeral 65 designates an auxiliary relay with one end connected to a defrosting timer relay 66 and with another end connected to the contact of the defrosting timer relay 66. Numeral 67 is a four-way valve with its one end connected to the power source and with another end connected to the contact of the defrosting timer relay 66. Numeral 68 designates an electromagnetic switch for the compressor with its one end connected to the power source and another end connected to a thermal regulator 69. Numeral 70 designates is an alarm lamp with its one contact 88₃ of the auxiliary relay 54.

Figure 6:
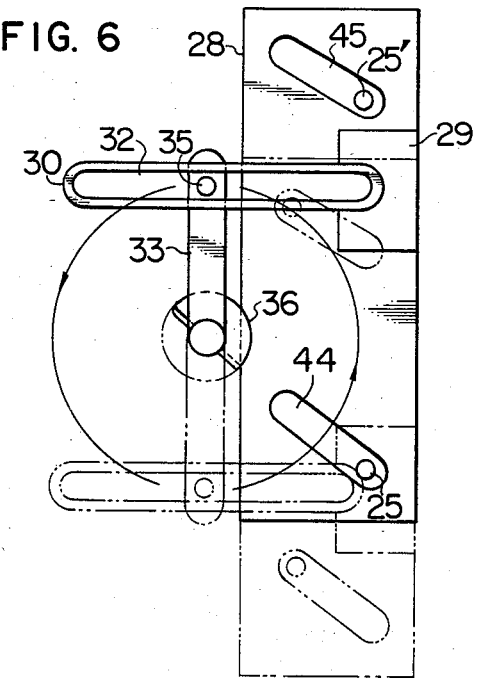
FIG. 6 is a plan view of the joint movement mechanism.

In the foregoing arrangement, the dampers are positioned as shown by the solid line in FIG. 1a when the total heat exchanger 10 is not activated, and the exhaust air flow is shown by an arrowed dotted flow and the intake air flow is shown by an arrowed blanked flow. When the total heat exchanger 10 is activated during a cooling or heating operation, the first and second auxiliary dampers 18 and 20 are opened as shown by the dashed line in FIG. 1a, and the double-wing damper 11 is positioned as shown by the dashed line. That is, the link bar 28, turn ring 30, arm 33, and cam set 36 are positioned as shown by the solid line in FIG. 6, so that the first and second auxiliary dampers 18 and 20 are open to ventilate air through the total heat exchanger 10. FIG. 1b shows the position of the dampers 11, 18 and 20, exhaust air flow and intake air flow when the heat exchanger 10 is activated.

The following Table 1 shows the operations when the air conditioner is halted or switched by switching the rotary switch 57 to the air-intake cooling operation following the above-mentioned cooling or heating operation.

TABLE 1

| Rotary switch | Cam position | 1st limit switch | 2nd limit switch | Damper motor |
|---|---|---|---|---|
| Cooling or heating | A | NO | NC | ON |
| ↓ | ↓ | ↓ | ↓ | ↓ |
|  | A' | NO | NO | ON |
| ↓ | ↓ | ↓ | ↓ | ↓ |
| Halt or air-intake | B | NO | NO | ON |
| ↓ | ↓ | ↓ | ↓ | ↓ |
| Cooling | C | NC | NO | OFF |

Figure 7B:
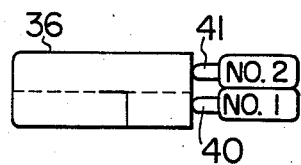

The table shows that the first limit switch 63 connected to one end of the damper motor becomes conductive between C and NO (C-NO). In FIG. 7, the contact position on the cam set 36 to the limit switch 39 rotates counterclockwise as A-A'-B-C, and the limit switch is conductive between C and NO when the limit switch confronts the cam section B, causing the halt contact and air-intake cooling contact to be activated through a lead 71. When the cam shaft 36 rotates by 180°, the contact position is shifted from A to C, and one operation cycle completes. At this time, the first limit switch 63 makes a transition from the C-NO conduction to the C-NC conduction, while the second limit switch 64 makes a transition from the C-NC conduction to the C-NO conduction. The current supply to the damper motor 62 through the first and second limit switches is cut off, and it is deactivated.

The following Table 2 shows the operations when the rotary switch 57 is switched from the above-mentioned halt position back to the cooling or heating position.

TABLE 2

| Rotary switch | Cam position | 1st limit switch | 2nd limit switch | Damper motor |
|---|---|---|---|---|
| Halt or air-intake cooling | C | NC | NO | ON |
| ↓ | ↓ | ↓ | ↓ | ↓ |
| ↓ | C' | NC | NC | ON |
|  | ↓ | ↓ | ↓ | ↓ |
| Cooling or heating | D | NC | NC | ON |
|  | ↓ | ↓ | ↓ | ↓ |
|  | A | NO | NC | OFF |

When the rotary switch 57 is switched to the position of the cooling or heating operation, the compressor electromagnetic switch 68 is energized, causing contact 52c to be closed. Then the auxiliary relay 55 is energized and its contact 55" is closed. The damper motor 43 is activated through the lead 72, and the cam set starts to make a revolution from the position shown by the dashed line in FIG. 6. In more detail, the contact position of the cam set 36 to the limit switch 39 shown FIG. 7 further rotates counterclockwise to move C-C'-D-A. At the position of D, the first limit switch 63 is conductive between C and NC, and finally it becomes conducts C to NO. On the other hand, the second limit switch 64 is initially conductive between C and NO, and as the cam set rotates, it becomes and stays in the C-NC conduction. When the cam set has rotated by 180°, the contact position moves from C to A, causing the damper motor 43 to be deactivated.

Next, the following Table 3 shows the operation which takes place when the rotary switch 57 has been switched from the cooling or heating position to the halt or air-intake cooling position, or from the halt or air-intake cooling position to the cooling or heating position, and then the rotary switch 57 is immediately switched to other position before completing the operation cycle, i.e., before the first and second auxiliary dampers 18 and 20 have not been closed or opened.

TABLE 3

| Rotary switch | Cam position | 1st limit switch | 2nd limit switch | Damper motor |
|---|---|---|---|---|
| Cooling or heating | A | NO | NC | ON |
| ↓ | ↓ | ↓ | ↓ | ↓ |
| Halt or air-intake cooling | A' | NO | NO | ON |
| ↓ | ↓ | ↓ | ↓ | ↓ |
| Halt or air-intake cooling | B | NO | NO | ON |
| ↓ | ↓ | ↓ | ↓ | ↓ |
| ↓ | C | NC | NO | ON |
|  | ↓ | ↓ | ↓ | ↓ |
|  | C' | NC | NC | ON |
|  | ↓ | ↓ | ↓ | ↓ |
| Cooling or heating | D | NC | NC | ON |
|  | ↓ | ↓ | ↓ | ↓ |
|  | A | NO | NC | OFF |

When the rotary switch 57 is switched from the cooling or heating position to the halt or air-intake cooling position, the contact position moves from A to A', then B, and the first limit switch 63 conducts C and NO, while the second limit switch 64 conducts C NC. Electric power is supplied through the rotary switch 57 and the lead wire 71, maintaining the damper motor 43 to be activated. At this moment, when the halt or air-intake cooling operation is switched to the cooling or heating operation, the cam set 36 is rotated by the damper motor 43 as C-C'-D-A while maintaining the contact at B, causing the first limit switch 63 to turn from the C-NO conduction to the C-NC conduction, and finally it conducts C and No. The second limit switch 64 turns from the C-NO conduction to the C-NC conduction, and the damper motor is deactivated at the contact position of A. In more detail, at the cam set contact position of B, the damper motor 43 is activated through the lead 71 or 72 whichever of NO or NC the first limit switch 63 is positioned, causing the cam set 36 to rotate by 360°. Upon completion of one operation cycle, the damper motor 43 stops as a position as directed by the rotary switch 57 (not at an intermediate position), and the auxiliary dampers are opened or closed completely.

As described above, the inventive air conditioner is provided with the first and second auxiliary dampers 18 and 20 between the intake air path 17 and the exhaust air path 16 in order to prevent the penetration of external air when the operation is halted. Both auxiliary dampers are provided with the pins 25 and 25' which are linked through the bar 28. There are provided the turn ring having an elongated opening 32 for opening and closing the auxiliary dampers by sliding the link bar 28, the arm 33 provided with the pin 35, and the cam set 36 integrated with the cam shaft 34 connected to the arm 33. The limit switch 39 in contact with the cam set 36 operates on the damper motor 43 to make a revolution in the sequence of the 180° rotation—halt—180° rotation.

Moreover, the operation circuit for the first and second dampers 18 and 20 is switched from cooling or heating to halt or air-intake cooling, or from air-intake cooling or halt to cooling or heating by the first limit switch, and during the transitional operations of cooling or heating to air-intake cooling, to halt, and then to the reverse operations, the damper motor rotates until the end of one operation cycle and stops at the state directed by the rotary switch, causing both auxiliary dampers to stop in the exact open or closed state.

According to the present invention, as described above, the first auxiliary damper is provided in the exhaust air path and the second auxiliary damper is provided in the intake air path so that they are closed when the air conditioner is halted or during the air-intake operation, or they are open during the operation, thereby preventing the penetration of external air during the halt state. Therefore, a rise in the room temperature during a cooling operation and the fall in the room temperature during the heating operation can be reduced, and the response of operation in the start-up period in the morning can be improved. In addition, both auxiliary dampers are moved jointly through the link bar by the mechanism including the supporter, turn ring, arm and cam set so as to achieve the one-revolution operating system, and thus the auxiliary dampers stop only at the exact open or closed state.

What is claimed is:

1. A through-wall type air conditioner for air conditioning of an indoor room, said air conditioner being capable of assuming a first, second or third mode of operation, said first mode being for exhausting indoor room air to introduce outdoor air into the indoor room to recover waste heat therebetween while circulating indoor room air for air conditioning thereof, the second mode being for exhausting indoor room air and introducing outdoor air to thereby cool the indoor room without said circulation for air conditioning and the third mode being for preventing significant ventilation of the room through said air conditioner when the first and second mode air conditioning operations are halted, said air conditioner comprising:

a first blower compartment housing an air conditioning means, said first blower for producing airflow flowing into said indoor room;

a second blower compartment housing a second blower for producing airflow flowing outdoors;

a heat exchanger defining first and second air-flow paths which are combined in a heat exchanging relationship to recover waste heat therebetween;

an indoor room air exhausting path for exhausting indoor room air through said airflow path and said second blower compartment;

an outdoor air intake path for introducing outdoor air through said first airflow path and said first blower compartment;

damper means having first and second operational positions respectively for said first mode and for said second and third modes wherein in said first operational position said damper means (i) opens said indoor room air exhausting path to said second airflow path to allow exhaustion or room air, (ii) opens said outdoor air intake path to said first airflow path to allow introduction of outdoor air and (iii) enables circulation of indoor room air through said room air exhausting path and said first blower compartment, and wherein in said second operational position said damper means closes said outdoor air intake path and said room air exhausting path respectively to said first and second airflow paths to prevent respective significant ventilation caused therethrough.

2. An air conditioner according to claim 1, wherein in said second operational position said damper means (i) opens said room air exhausting path to said second blower compartment to allow exhaustion of indoor room air therethrough and (ii) enables an outdoor air introduction path to be defined through said intake path and said first blower compartment without air passing through said heat exchanger.

3. A through-wall air conditioner for air conditioning of an indoor room, said air conditioner being capable of assuming a first or a second mode, said first mode being for exhausting indoor room air to introduce outdoor air into the indoor room to recover waste heat therebetween while circulating indoor room air for air conditioning thereof and the second mode being for exhausting indoor room air and introducing outdoor air to thereby cool the indoor room without said circulation for air conditioning, said air conditioner comprising:

a first blower compartment housing an air conditioning means, said first blower for producing an airflow flowing into said indoor room;

a second blower compartment housing a second blower for producing an airflow flowing outdoors;

a heat exchanger provided between said first and second blower compartments and defining first and second airflow paths which are combined in a heat exchanging relationship to recover waste heat therebetween;

an exhaust air path for providing communication between said indoor room and said second blower compartment through said second airflow path;

an intake air path for providing communication between said first blower compartment and outdoor air through said first airflow path; and a double-wing damper means and an auxiliary damper means respectively having first and second operational positions respectively for said first and said second modes, wherein in said first mode said auxiliary damper means assumes the first operational position to allow communication between said indoor room and said second blower compartment through said exhaust air path and said second airflow path to exhaust room air therethrough and to allow communication of outdoor air and said first blower compartment through said intake air path and said first airflow path to introduce outdoor air into said indoor room, and in the first operational position said double-wing damper means closes said exhaust air path to said second blower compartment to define an indoor room air circulation path through said first blower compartment for the air conditioning of indoor room air, and wherein in said second mode said double-wing damper means assumes the second operational position to open said exhaust air path to said second blower compartment to exhaust room air therethrough and to open said intake air path to outdoors to introduce outdoor air into said indoor room without air passing through said heat exchanger, and in the second operational position said auxiliary damper means closes said exhaust air path to said second airflow path to prevent said communication of said indoor room and said second blower compartment and closes said intake air path to said first airflow path to prevent said communication of outdoor air and said first blower compartment.

4. An air conditioner according to claim 3, wherein said double-wing damper means has first and second pivotally rotatable dampers, said first damper assumes the first operational position to close said exhaust air path to said second blower compartment to define the room air circulation path, and said second damper has plural pass holes and assumes the first operational position to close said intake air path to said second blower compartment and to exhaust indoor room air through said exhaust air path, said second airflow path and said pass holes.

5. An air conditioner according to claim 3, further comprising means for causing said air conditioner to assume a third mode in which said first and second mode air conditioning operations are halted by holding said second operational position of said auxiliary damper means to prevent significant ventilation of said indoor room through said first and second airflow paths of said heat exchanger.

6. A through-wall type refrigeration air conditioner having a compressor, condensor and evaporator for forcible or natural air conditioning of an indoor room by exhausting indoor room air and introducing outdoor air into said indoor room, said forcible air conditioning being effected by thermally controlling the introduced air and said natural air conditioning being effected by introducing outdoor air into the indoor room without the thermal control, said air conditioner comprising:

a first blower compartment housing a first heat exchanger, said first blower for producing an airflow flowing into said indoor room from outdoors;

a second blower compartment housing a second heat exchanger, said second blower for producing an airflow flowing outdoors from said room;

a heat exchanger provided between said compartment and defining first and second airflow paths which are in a heat exchanging relationship and are to be communicated with said first and second compartments respectively;

an exhaust air path for exhausting said indoor room;

an intake air path for introducing outdoor air into said indoor room;

a double-wing damper means having first and second operating positions respectively for the forcible and natural air conditioning of said indoor room, said first operating position defining an outdoor air circulation path through said intake air path and said second blower compartment and defining a room air circulation path through said exhaust air path and said first blower compartment, said second operating position defining an outdoor air introducing path through said intake air path and said first blower compartment and defining a room-air exhausting path through said exhaust air path and said second blower compartment; and auxiliary damper means selectively openable and closable to define or prevent communication of said exhaust air path with said second airflow path and communication of said intake air path with said first airflow path to concurrently allow or prevent exhaustion of indoor room air of said exhaust air path and introduction of outdoor air of said intake air path respectively through said heat exchanger for forcible or natural air conditioning of said indoor room, whereby closure of said auxiliary damper means secures said outdoor air introducing path through said intake air path and said first blower compartment without air passing through said heat exchanger for natural air conditioning of said indoor room.

* * * * *